US010613748B2

(12) United States Patent
Alcorn et al.

(10) Patent No.: US 10,613,748 B2
(45) Date of Patent: Apr. 7, 2020

(54) STYLUS ASSIST

(71) Applicant: Google LLC, Mountain View, CA (US)

(72) Inventors: Zachary Alcorn, Sunnyvale, CA (US); Jennifer Chen, San Francisco, CA (US); Alexander Friedrich Kuscher, San Francisco, CA (US); Sebastien Gabriel, San Francisco, CA (US); Maria Cirimele, East Palo Alto, CA (US); Thomas Buckley, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 11 days.

(21) Appl. No.: 15/724,227

(22) Filed: Oct. 3, 2017

(65) Prior Publication Data
US 2019/0102080 A1    Apr. 4, 2019

(51) Int. Cl.
*G06F 3/0488*  (2013.01)
*G06F 16/332*  (2019.01)
*G06F 9/451*   (2018.01)
*G06F 16/2457* (2019.01)
*G06F 16/248*  (2019.01)
(Continued)

(52) U.S. Cl.
CPC ...... *G06F 3/04883* (2013.01); *G06F 3/03545* (2013.01); *G06F 3/0481* (2013.01); *G06F 3/04842* (2013.01); *G06F 9/453* (2018.02); *G06F 16/248* (2019.01);
(Continued)

(58) Field of Classification Search
CPC ............. G06F 3/04883; G06F 3/04842; G06F 3/03545; G06F 3/0481; G06F 9/453; G06F 17/3053; G06F 17/276; G06F 17/30554

See application file for complete search history.

(56) References Cited

U.S. PATENT DOCUMENTS 5,155,813 A * 10/1992 Donoghue .......... G06F 3/04845
                                                    345/179
5,361,333 A * 11/1994 Ahlquist, Jr. ......... G06T 11/203
                                                    345/442

(Continued)

OTHER PUBLICATIONS

Invitation to Pay Additional Fees for International Application No. PCT/US2018/040868, dated Oct. 2, 2018, 14 pages.

(Continued)

*Primary Examiner* — Mihir K Rayan
(74) *Attorney, Agent, or Firm* — Brake Hughes Bellermann LLP

(57) ABSTRACT

Methods for providing information related to selected content and a suggested completion of one or more written words are provided. In one aspect, a method includes invoking an assistant tool, displaying an assistant window on a device display, receiving an indication of a selection of content on the display, generating a query for information associated with the selected content, receiving ranked results from the query, and displaying the received results in the assistant window. In one aspect, a snapshot of the selected content is captured and displayed with the results. In one aspect, a method includes receiving an indication of one or more words being written on the display and providing at least one suggested completion of a word or sentence being written. Systems and machine-readable media are also provided.

15 Claims, 9 Drawing Sheets

(51) Int. Cl.
*G06F 3/0354* (2013.01)
*G06F 3/0481* (2013.01)
*G06F 3/0484* (2013.01)
*G06F 17/27* (2006.01)

(52) U.S. Cl.
CPC ...... *G06F 16/24578* (2019.01); *G06F 16/332* (2019.01); *G06F 17/276* (2013.01)

(56) References Cited

U.S. PATENT DOCUMENTS

| | | | | |
|---|---|---|---|---|
| 5,465,325 | A | * | 11/1995 | Capps ................ G06F 3/04845 345/441 |
| 5,523,775 | A | * | 6/1996 | Capps ................ G06F 3/04842 178/18.01 |
| 5,680,480 | A | * | 10/1997 | Beernink ................ G06K 9/033 382/155 |
| 5,757,383 | A | * | 5/1998 | Lipton ................ G06F 17/214 345/442 |
| 5,982,370 | A | | 11/1999 | Kamper |
| 6,525,749 | B1 | * | 2/2003 | Moran ................ G06F 3/04883 345/156 |
| 7,659,590 | B2 | * | 2/2010 | Boland ................ B82Y 10/00 257/40 |
| 7,941,446 | B2 | | 5/2011 | Hubert |
| 9,460,715 | B2 | | 10/2016 | Hart et al. |
| 9,466,048 | B2 | | 10/2016 | Liggett |
| 9,740,737 | B2 | | 8/2017 | Zupancic |
| 2005/0116945 | A1 | * | 6/2005 | Mochizuki ........... G06K 9/2081 345/418 |
| 2008/0104020 | A1 | * | 5/2008 | Kato ..................... G06F 16/332 |
| 2010/0100839 | A1 | * | 4/2010 | Tseng .................... G06F 1/1624 715/780 |
| 2011/0107206 | A1 | * | 5/2011 | Walsh ................. G06F 17/2785 715/256 |
| 2012/0044179 | A1 | * | 2/2012 | Hudson ............... G06F 3/04883 345/173 |
| 2012/0078945 | A1 | | 3/2012 | Hurst |
| 2012/0284596 | A1 | | 11/2012 | Bushnell et al. |
| 2013/0191785 | A1 | * | 7/2013 | Rampson ............. G06F 3/0488 715/845 |
| 2015/0205490 | A1 | * | 7/2015 | Nordstrom .......... G06F 3/04842 715/739 |
| 2015/0242474 | A1 | | 8/2015 | Mikalsen et al. |
| 2015/0269231 | A1 | * | 9/2015 | Huynh ................. G06F 16/951 707/722 |
| 2016/0155442 | A1 | | 6/2016 | Kannan et al. |
| 2016/0188143 | A1 | | 6/2016 | Kohlmeier et al. |
| 2016/0323217 | A1 | | 11/2016 | Subramani et al. |
| 2017/0052937 | A1 | * | 2/2017 | Sirven ................. G06F 3/04845 |
| 2017/0220567 | A1 | | 8/2017 | Masson et al. |

OTHER PUBLICATIONS

International Search Report and Written Opinion for International Application No. PCT/US2018/040868, dated Nov. 28, 2018, 18 pages.

* cited by examiner

Default Point Size

Text Highlight Sample

Stroke Width Unified at 4dp

STYLUS ASSIST

TECHNICAL FIELD

The present disclosure generally relates to providing content related information, and more specifically relates to an assistant tool for providing and displaying information related to selected content.

BACKGROUND

When a user of a device selects or specifies on-screen content with a stylus or other input device, it may be desired to receive actions and/or information related to the selected content. To obtain further information, the user is commonly required to manually identify or search for such additional information related to the selected content.

The description provided in the background section should not be assumed to be prior art merely because it is mentioned in or associated with the background section. The background section may include information that describes one or more aspects of the subject technology.

SUMMARY

According to certain aspects of the present disclosure, a computer-implemented method for providing information related to selected content is provided. The method includes invoking an assistant tool on an electronic device and providing, on a display of the electronic device, an assistant window. The method also includes receiving, from an input source of the electronic device, an initial stroke on the display of the electronic device and morphing, by the assistant tool, the initial stroke of the input source on the electronic device into a uniform stroke, wherein the uniform stroke is an indication of a selection of content. The method further includes generating, by the assistant tool, a query for information associated with a portion of the selected content. The method also includes receiving, by the electronic device, at least one highest ranked result from the query, wherein a result rank indicates the relevance of the result to the portion of the selected content and providing, by the assistant tool, the received results for display in the assistant window.

According to certain aspects of the present disclosure, a system for providing information related to selected content is provided. The system includes a memory and a processor configured to execute instructions. The executed instructions cause the processor to invoke an assistant tool on a client device; provide an assistant window on a display of the client device; receive, from an input source of the client device, an indication of a selection of content on the display; generate, by the assistant tool, a query for information associated with a portion of the selected content; receive, by the client device, at least one result from the query; identify, by the assistant tool, an area of the selected content; capture, by the assistant tool, a snapshot of the identified area; and provide, by the assistant tool, the captured snapshot and the received at least one result for display in the assistant window.

According to certain aspects of the present disclosure, a non-transitory machine-readable storage medium comprising machine-readable instructions for causing a processor to execute a method for providing information related to selected content is provided. The method includes invoking an assistant tool on a mobile device, providing an assistant window on a display of the mobile device and receiving an initial stroke of the input device on the display. The method further includes morphing the initial stroke into a uniform stroke, wherein the uniform stroke is an indication of a selection of content. The method also includes generating, by the assistant tool, a query for information associated with the selected content and receiving, by the mobile device, ranked results from the query, wherein a result rank is a confidence level of relevance to the selected content. The method further includes providing, by the assistant tool, a snapshot of the selected content and the received ranked results for display in the assistant window.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
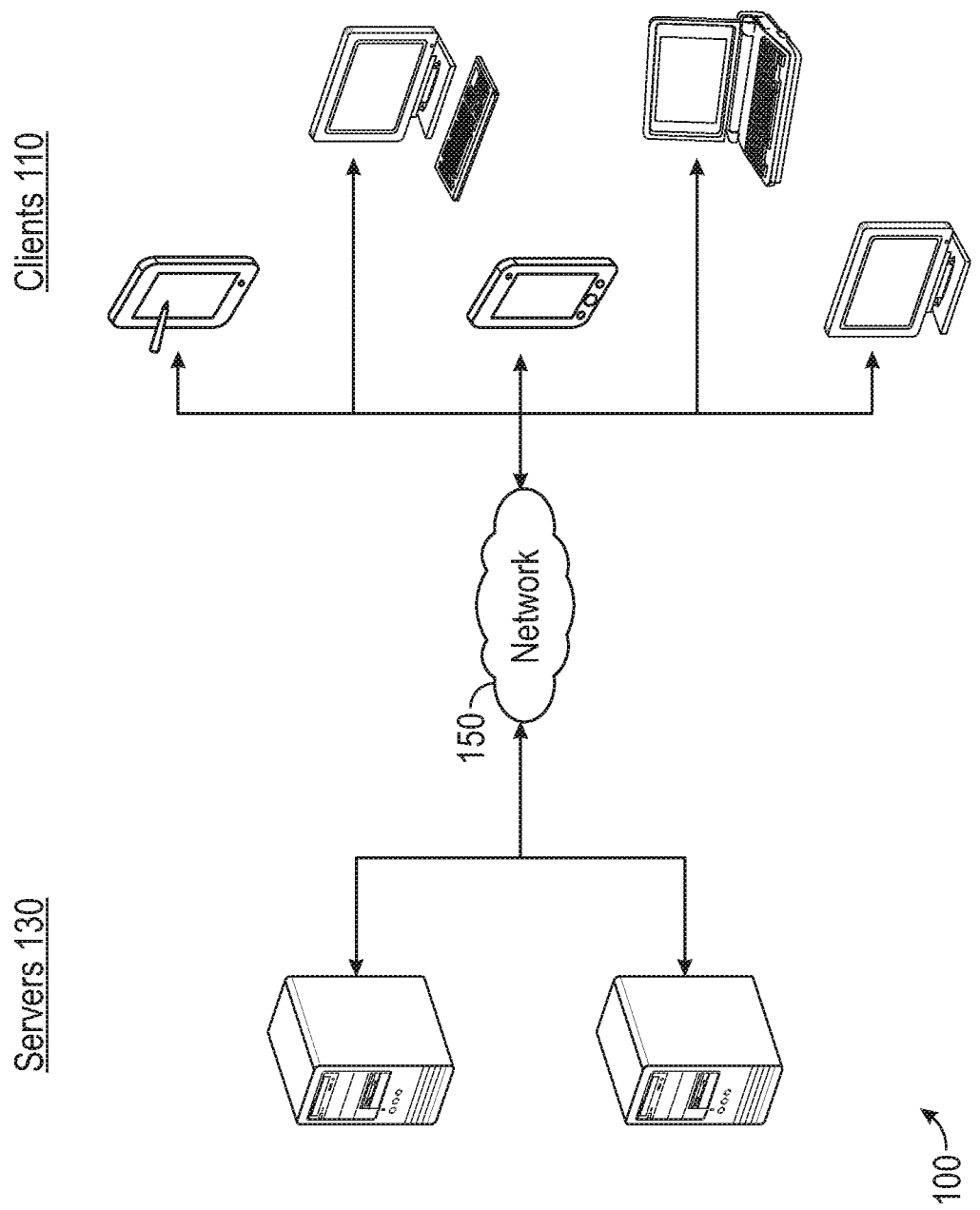
FIG. 1 illustrates an example architecture for providing interactive content and information that are related to selected content, or a suggested completion of one or more written words.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides a stylus assistant tool that is invoked to provide actions and information related to selected content or a suggested completion of one or more written words.

Specifically, the user selects or triggers a stylus assistant tool on a client device. The trigger to select the stylus assistant tool may be a hardware trigger or a software trigger. For example, pressing a physical button or switch on a stylus may invoke the stylus assistant tool. As another example, selecting an assistant mode from a stylus menu on the client device (e.g., a drop down menu) may invoke the stylus assistant tool. Once the stylus assistant tool is invoked, an assistant window may be opened up on the display of the client device. The assistant window may provide a prompt to select a content item displayed on the client device.

The content item may be selected by highlighting on-screen content (e.g., single, unbroken stroke not forming a particular shape), underlining on-screen content, drawing a more or less closed shape or a fully closed shape (e.g., circle, rectangle, square, triangle, polyhedron) around on-screen content, or writing one or more words. The selection of the content or the writing of the words may be made by an input source, such as a stylus or a finger. The stylus assistant tool then obtains and displays additional information related to the selected content or provides suggested completions of incomplete words or sentences. For example, the stylus assistant tool may provide results of a web search for a selected term, a definition of the term, and images associated with the term. The results may be displayed along with a snapshot of the selected content. Here, a circle may be drawn around a section of displayed content, and the stylus assistant tool may identify or determine a rectangular area of content within the drawn circle, for example. A screenshot or snapshot of the content within the identified rectangular area may then be captured and displayed with the results.

The stylus assistant tool may have several properties, such as tip properties, ink properties and shape morphing properties. For the tip properties, the stylus ink used to highlight or circle content takes the shape of a highlighter, so that the virtual tip of the stylus is slanted at a 45 degree angle. Though the output on the display screen may remain the same for any position the user tilts the stylus, the stylus may send rotation and left/right incline input to influence the line that is drawn, thus catering better to the user's right or left handedness.

Regarding the ink properties, the tracing is made to look like a natural drawing with a highlighter by computing the rotation and incline of the stylus to deliver a natural stroke based on a default width and height (e.g., 4×14). For a highlighting stroke, the stylus assistant tool analyzes anything that is directly underneath the ink of the highlighting. Similarly, for a closed shape drawn around content, the stylus assistant tool analyzes the content that is inside the closed shape. Further, for an underlining stroke, the stylus assistant tool analyzes anything that is displayed above the ink line of the underlined content.

The shape morphing properties may be used as validation and/or communication of success in selecting content. For example, the stylus assistant tool may be successfully triggered by receiving valid input at an initial state when the user draws a circle around a name. The initial stroke may then be morphed into a unified width (e.g., 4 dp) having a uniform closed shape in an end state. Similarly, a valid highlighting stroke may trigger the stylus assistant tool in an initial state, and the stroke may be morphed (e.g., straightened) with a unified height (e.g., 14 dp) in an end state.

The disclosed system addresses a technical problem tied to computer technology and arising in the realm of computer networks, namely the technical problem of, in response to detection of a selected content item on a device, identifying additional actions and information related to the selected content item, for example, over a network in order to provide and display further actions/information related to the selected content item. The disclosed system solves this technical problem by analyzing one or more databases of possible information to identify relevant information that is most suitable for displaying with regards to the selected content item, and obtaining such information over a network if it is not available on the device. The disclosed system provides a solution necessarily rooted in computer technology as it relates to the analysis of a selected content item to identify, and obtain, suitable relevant information to display with the content item or in response to the selection of the content item. For example, the disclosed system facilitates allowing content items such as URLs from the World Wide Web to be displayed when the content item is selected, though the content item itself may not be interactive. As a result, a richer user experience may be provided with regard to static or active content items.

Although certain examples provided herein may describe a user's information (e.g., a selection of a content item to be accessed) being stored in memory, each user may grant explicit permission for such user information to be stored. The explicit permission may be granted using privacy controls integrated into the disclosed system. If requested user information includes demographic information, the demographic information is aggregated on a group basis and not by an individual user. Each user may be provided notice that such user information will be stored with such explicit consent, and each user may at any time end having the user information stored, and may delete the stored user information. The stored user information may be encrypted to protect user security.

The user can delete the user information from memory. Additionally, the user can adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user. Certain data may be treated in one or more ways before it is stored or used, so that personally identifiable information is removed. For example, a user's identity may be treated so that no personal identifiable information can be determined for the user, or a user's geographic location may be generalized where location information is obtained (such as to a city, ZIP code, or state level), so that a particular location of a user cannot be determined.

Example System Architecture

FIG. 1 illustrates an example architecture 100 for providing actions and information related to selected content or a suggested completion of one or more written words. The architecture 100 includes servers 130 and clients 110 connected over a network 150.

The clients 110 can be, for example, desktop computers, mobile computers, tablet computers (e.g., including e-book readers), mobile devices (e.g., a smartphone or personal digital assistant), set top boxes (e.g., for a television), video game consoles, or any other devices having appropriate processor, memory, and communications capabilities for running an assistant tool that provides actions or information related to selected content or written words, for display. Upon the selection of the assistant tool by either a hardware trigger (e.g., stylus button) or a software trigger (e.g., menu selection), selection of a content item or writing of one or more words on the display of the client 110 are provided by an input source (e.g., stylus, finger). The selected assistant tool queries resources on the client 110 or over the network 150 from one of the servers 130 to obtain and display additional content, information related to the selected content or suggested completions for the words being written (e.g., incomplete words or sentences).

One or more of the many servers 130 are configured to host various databases that include actions, documents, graphics, files and any other sources of content items. The databases may include, for each source in the database, information on the relevance or weight of the source with regards to the selected content item on the client 110. The application database on the servers 130 can be queried by clients 110 over the network 150. For purposes of load balancing, multiple servers 130 can host the application database either individually or in portions.

The servers 130 can be any device having an appropriate processor, memory, and communications capability for hosting content and information. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
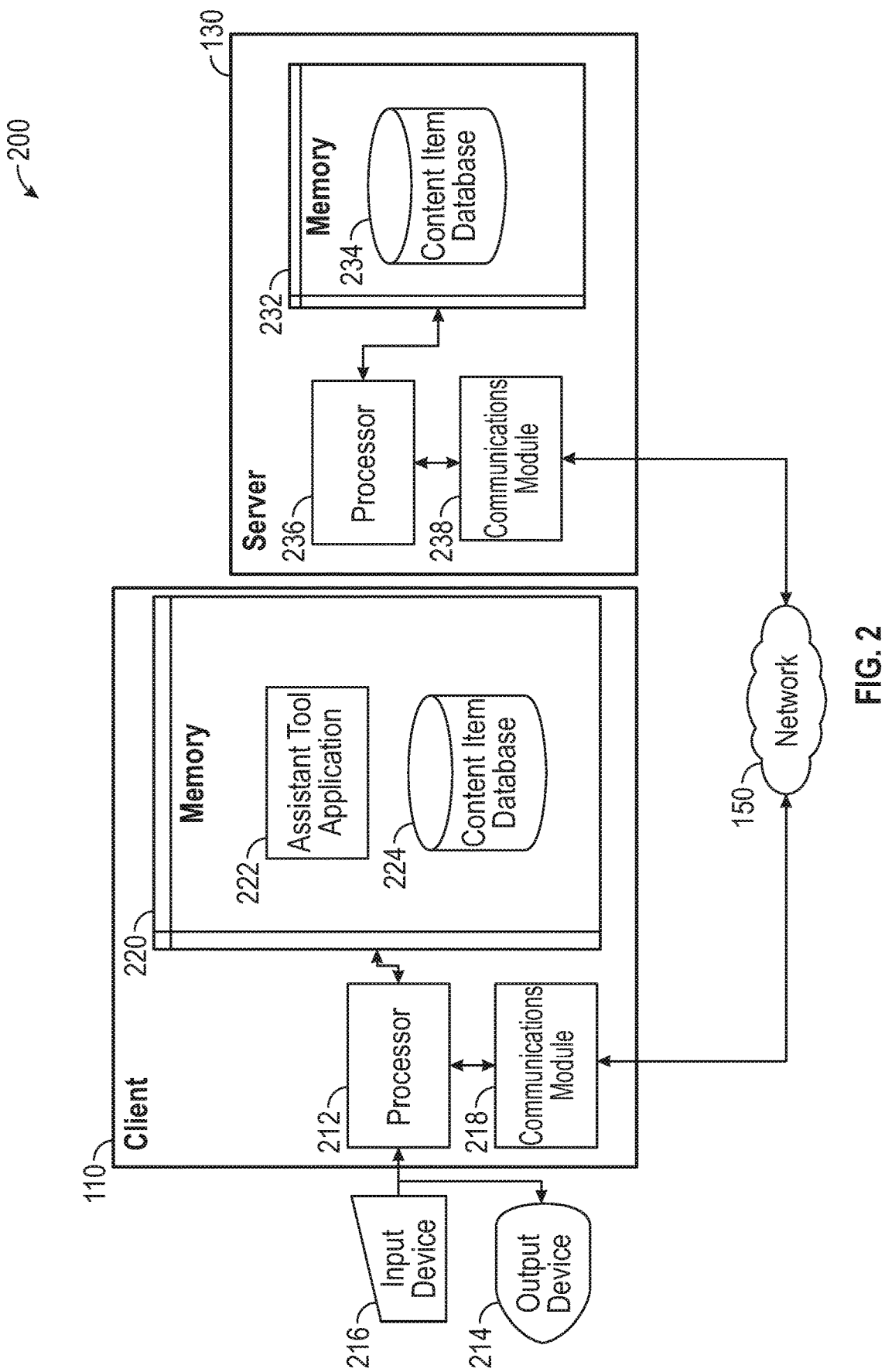
FIG. 2 is a block diagram illustrating an example client and server from the architecture of FIG. 1 according to certain aspects of the disclosure.

Example System for Invoking an Assistant Tool to Provide Interactive Content, Information and Suggested Completion of Written Words FIG. 2 is a block diagram 200 illustrating an example server 130 and client 110 in the architecture 100 of FIG. 1 according to certain aspects of the disclosure.

The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards. The client 110 also includes an input device 216, such as a stylus, touchscreen, keyboard, or mouse, and an output device 214, such as a display. The server 130 includes a processor 236, the communications module 238, and a memory 232. The memory 232 includes a content item database 234.

The client 110 further includes a processor 212, the communications module 218, and a memory 220. The memory 220 includes an assistant tool application 222 and a content item database 224. The content item database 224 may include, for example, a URL, a web page, a document such as a text document, a spreadsheet, a media file (e.g., audio, image, video, or any combination thereof), or any other data object configured to be interacted with by a user of the client 110. The content item database 224 may also include passive content items that are not inherently interactive, such as text, photographs, graphic images, etc. In certain aspects, the content items may be more generic intents such as actions to be performed including, for example, taking a photograph, opening an interactive map or listening to an audio file. The assistant tool application 222 may be configured to provide interaction with a content item from the content item database 224, such as determining a selection of the content item, identifying an area of the selected content and capturing a snapshot of the identified area, querying the content item database 224 on the client and content item databases 234 on the servers 130 for information relevant to the selected content item, determining the most suitable relevant information, and providing the most suitable relevant information with the captured snapshot of the identified area of selected content for display on the client 110, either in conjunction with or in place of the selected content item.

The processors 212, 236 of the client 110, server 130 are configured to execute instructions, such as instructions physically coded into the processor 212, 236 instructions received from software in memory 220, 232 or a combination of both. For example, the processor 212 of the client 110 may execute instructions to select a content item from the content item database 224, to identify an area within the selected content item on the display 214 of the client 110, to capture a snapshot of the identified area, to generate a query to either or both client 110 and server 130 content item databases 224, 234 for information relevant to the selected content item, to determine a weight/rank/suitability factor of identified relevant information, and to provide the most relevant information for display on the client 110. The processor 236 of the server 130 may execute instructions to analyze a query from the client 110, to search content item databases 234 for information relevant to the selected content item, to obtain or determine a confidence/weight/suitability factor or level for resulting relevant information, to rank the resulting relevant information, and to provide a number of the ranked relevant information to the client 110. The client 110 is configured to access the application database 234 on the server 130 over the network 150 using the respective communications modules 218 and 238 of the client 110 and server 130.

Specifically, the processor 212 of the client 110 executes instructions (e.g., from the assistant tool application 222) causing the processor 212 to receive user input (using the input device 216) in the assistant tool application 222 to determine selection of a content item within the content item database 224. For example, the user can select the content item using a stylus or a finger by highlighting on-screen content (e.g., single, unbroken stroke not forming a particular shape), underlining on-screen content, or drawing a more or less closed shape (e.g., circle, rectangle, square) around on-screen content that is displayed on the output device 214 (e.g., a touch screen display). As another example, the user can write one or more words on the display using a stylus or a finger, and the assistant tool application 222 may identify the written words as being selected.

Figure 3A:
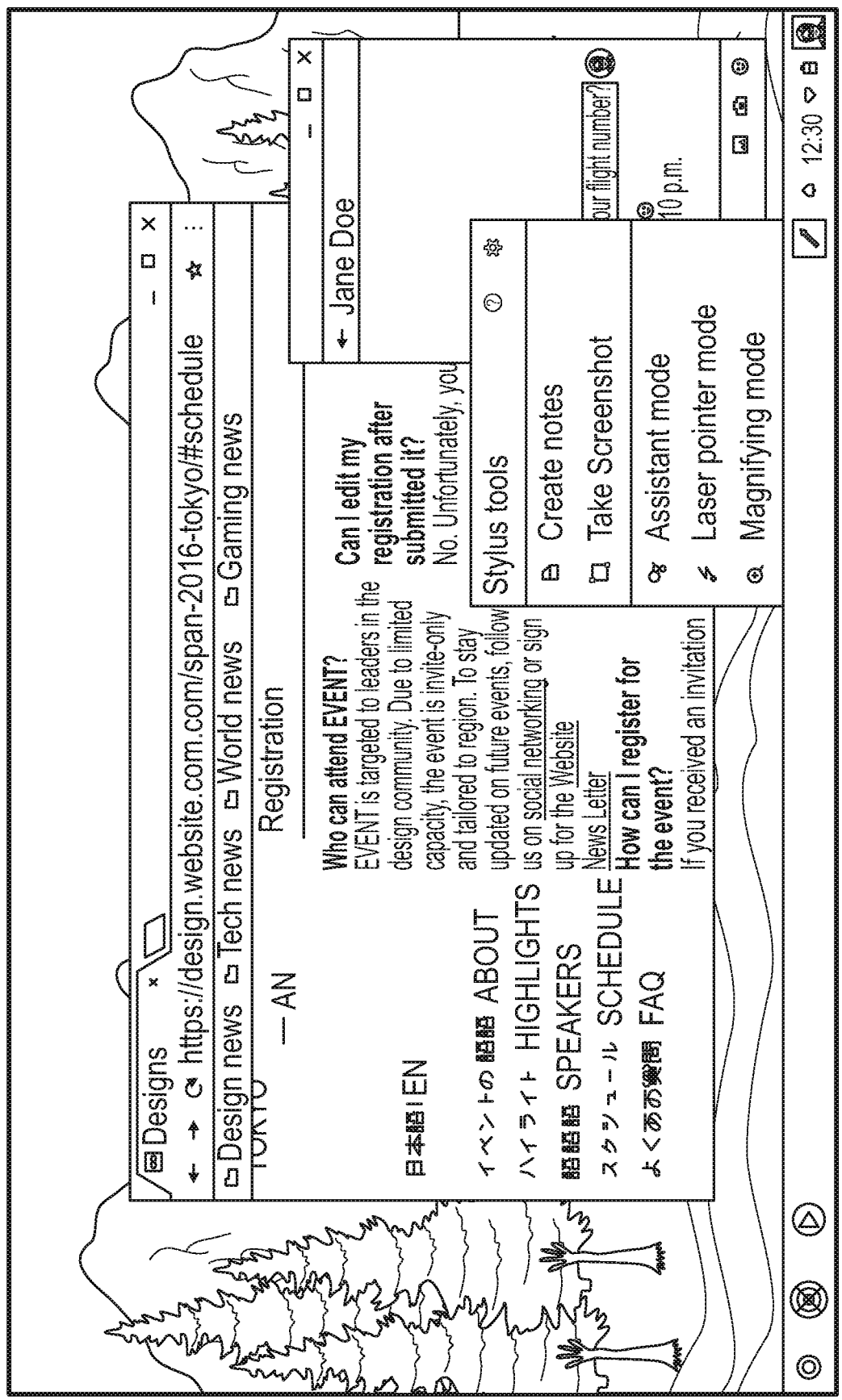
FIGS. 3A-3C are example illustrations associated with the disclosure of FIG. 2.
Figure 3B:
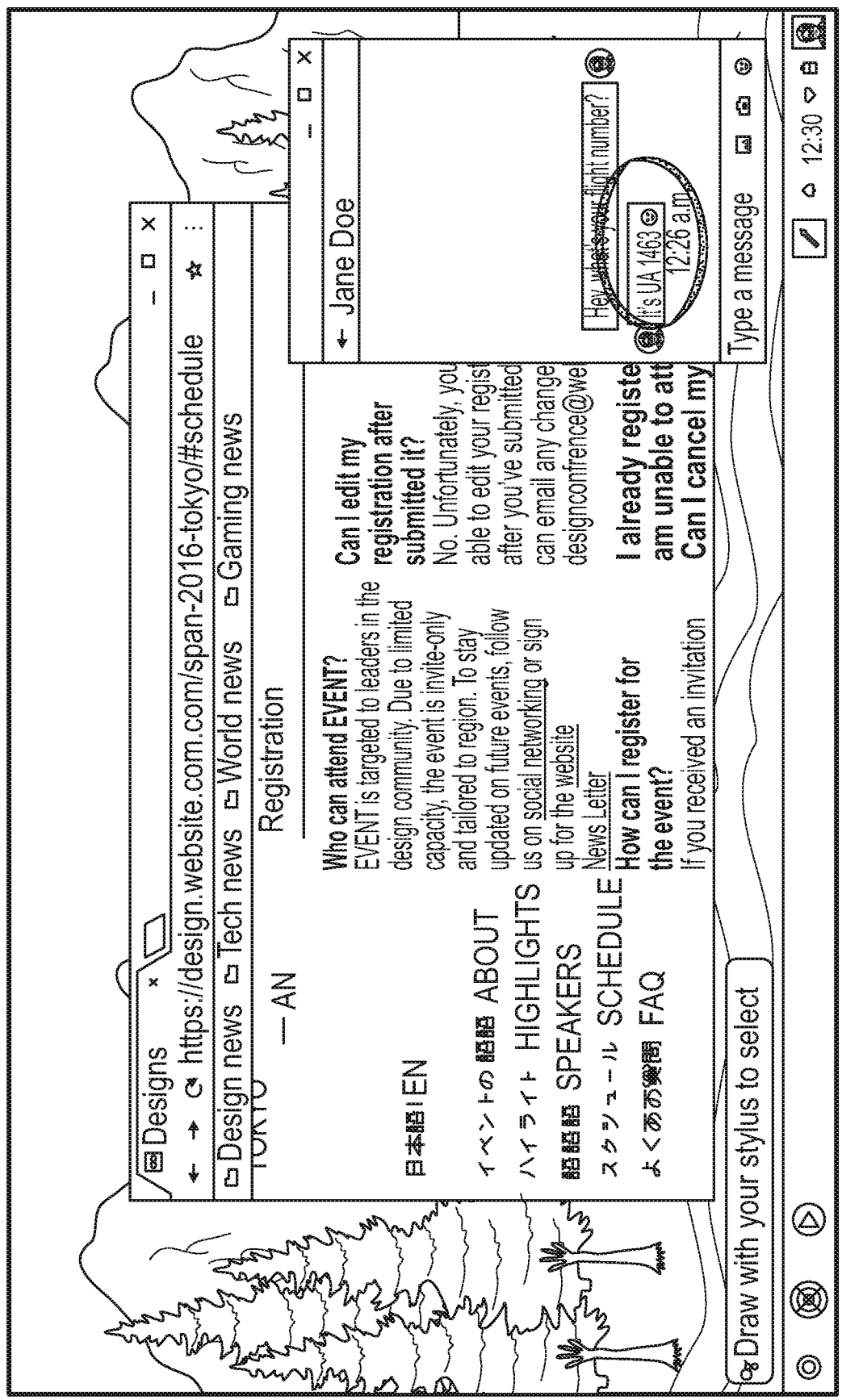

The processor 212 of the client 110 also executes instructions (e.g., from the assistant tool application 222) causing the processor 212 to analyze the selected content item, to identify and capture a snapshot of an area of the selected content item, to generate a query for additional content and information related to the selected content, and to display the captured snapshot and relevant results of the search/query. For example, as shown in FIG. 3A, a user may select the "Assistant mode" in a Stylus tools window, which invokes the stylus assistant tool. As shown in FIG. 3B, invoking the stylus assistant tool opens an assistant window that provides a prompt (e.g., "Draw with your stylus to select"). The user may then draw a circle around a section of the displayed text window with a stylus or a finger to select the content within the circle (e.g., a portion of the text question "Hey, what's your flight number?," the text response "It's UA 1463," the smiley emoji and the time stamp "12:28 pm," as shown in FIG. 3B.

Figure 3C:
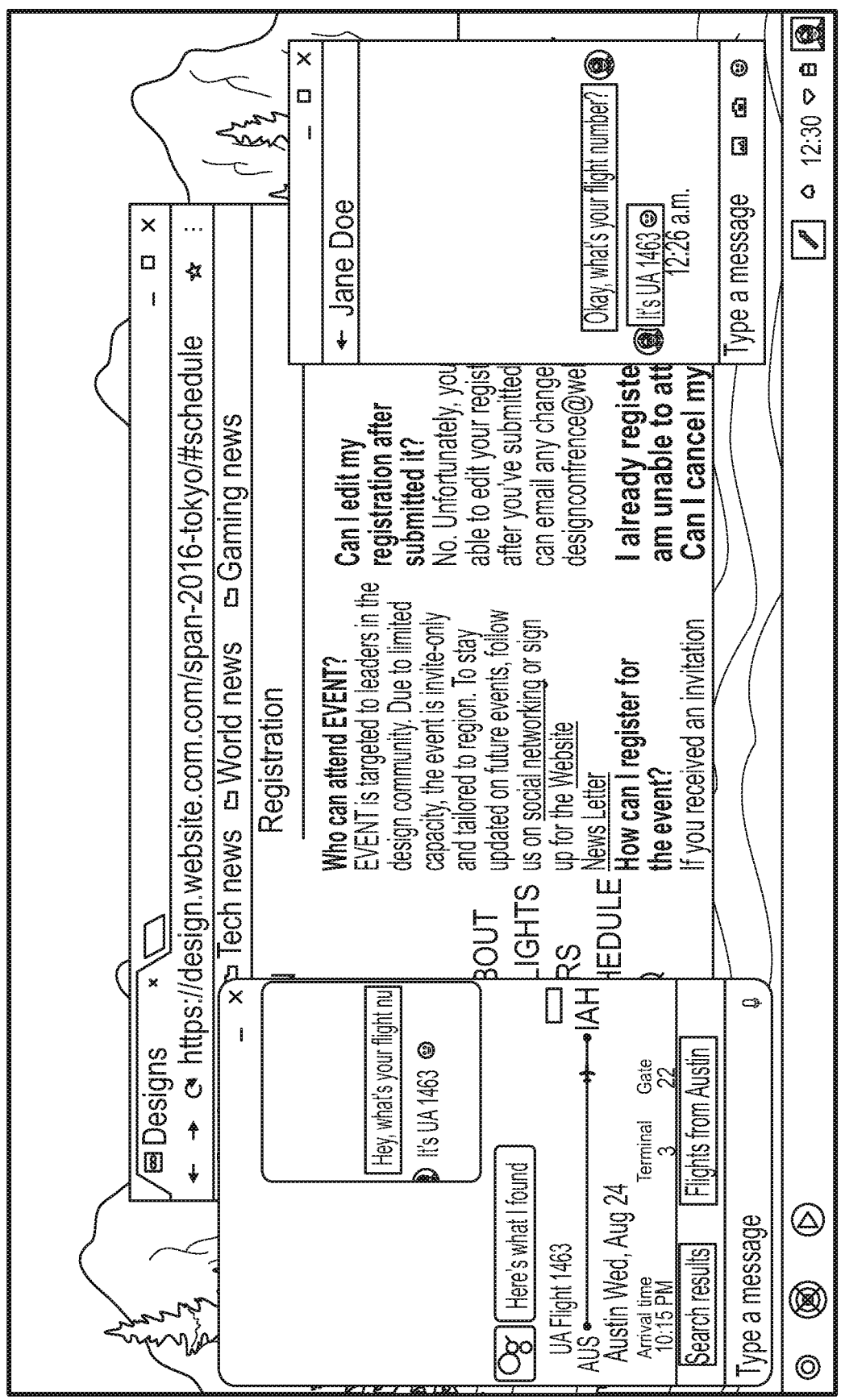

The selection of the content triggers the assistant tool application 222 to identify an area of the circled content and to take a snapshot of that identified area, such as the rectangular area with rounded corners shown in the assistant window of FIG. 3C. The assistant tool application 222 also initiates a query to search for information relevant to the circled text message "It's UA 1463," such as flight details, travel booking applications, information related to the travel locations, etc. The information search may be conducted by either or both the client 110 and one or more of the servers 130. For example, a query with the captured snapshot may be sent to a server 130, which may run image recognition and/or image search processes on the captured snapshot. As another example, the server 130 may run text recognition and text search processes on any of the selected circled text (e.g., "It's UA 1463"). In yet another example, the server 130 may analyze metadata (e.g., tags, keywords) associated with the selected content and run searches on the results of the metadata analysis. The server 130 may then obtain or determine confidence levels for each of the results of any or all searches and analysis, rank the results by confidence level and send a number of the ranked results (e.g., three top ranked results) back to the client 110. Analysis and search processes may also be done by the client 110 on information locally stored on the client 110.

As shown in FIG. 3C, results of the search are then displayed in the assistant window in conjunction with (e.g., overlaying a portion of) the previously displayed content. Here, the assistant window displays the captured snapshot, an assistant tool message "Here's what I found," and results of the query, including detailed information about UA flight 1463(e.g., destination city, date, arrival time, arrival terminal and arrival gate), as well as additional options for further use of the information (e.g., a "Search results" button and a "Flights from Austin" button). Thus, the client 110 obtains and displays associated information and interactive features for further search by selection of displayed content on the client 110 when in the stylus assistant tool mode, without having to leave the displayed content on the client 110, type in search criteria or click through additional links/search screens.

The assistant tool application 222 may also provide/display additional information based on drawing a substantially enclosing shape (e.g., circling) around a picture of a thing/place or a position on a displayed map. For example, the input device 216 (e.g., stylus, finger) may be used to circle an image of the clear inverted pyramid in front of the Louvre museum in Paris, thus triggering the assistant tool application 222 to obtain and provide various information on the Louvre, such as museum visiting hours, the location of the Louvre on a map, travel directions, or a listing of featured artists or events. In yet another example, a user may begin writing a message with the stylus, triggering the assistant tool application 222 to obtain and display suggested completions of words or sentences for the message being written.

The processor 236 of the server 130 may further execute instructions based on the query generated by the assistant tool application 222, the instructions causing the processor 236 to compare search/query results and to determine the most suitable results relative to the selected content. For example, the search results related to the text message "It's UA 1463" selected in FIG. 3B may also yield a map of Austin, a schedule of events happening in Austin on August 24, and the weather forecast for Austin on August 24. A ranking application on the server 130 may then analyze all of the search results and determine a number of top results, such as a predetermined number (e.g., top three results) or only results exceeding a threshold of relevance. For example, the detailed information about UA flight 1463 may be determined to be the most relevant (e.g., highest ranked) information associated with the selected content in FIG. 3A. The server 130 provides this most relevant information to the client 110, which is then displayed as shown in FIG. 3C. However, other information (e.g., lower ranked information) related to the search results is not sent by the server 130 to the client 110, and thus not displayed on the client 110.

As another example, search results may be provided by the server 130 to the assistant tool application 222 on the client 110, and the assistant tool application 222 may rank or otherwise sort the received search results by relevance. Here, the assistant tool application 222 may then provide/display information related to a number of top results (e.g., top three ranked results, ranked results exceeding a threshold of relevance). The assistant tool application 222 may also receive ranked results from the server 130, analyze and re-rank the received results, and display the most relevant of the re-ranked results. The assistant tool application 222 may also combine the results received from the server 130 and results generated by the client 110 for analyzing and re-ranking.

Figure 4A:
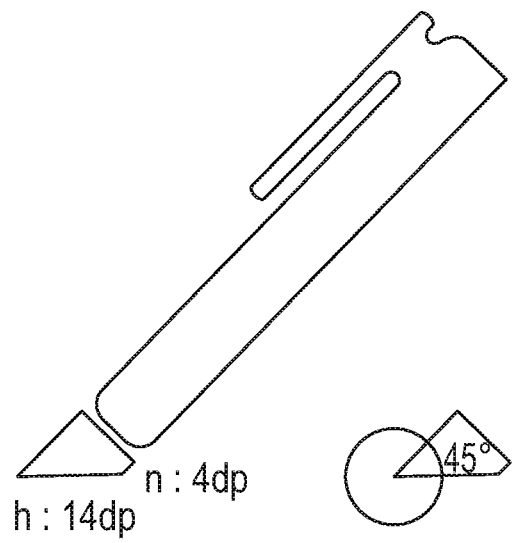
FIGS. 4A-4C are example illustrations associated with the disclosure of FIG. 2.
Figure 4B:
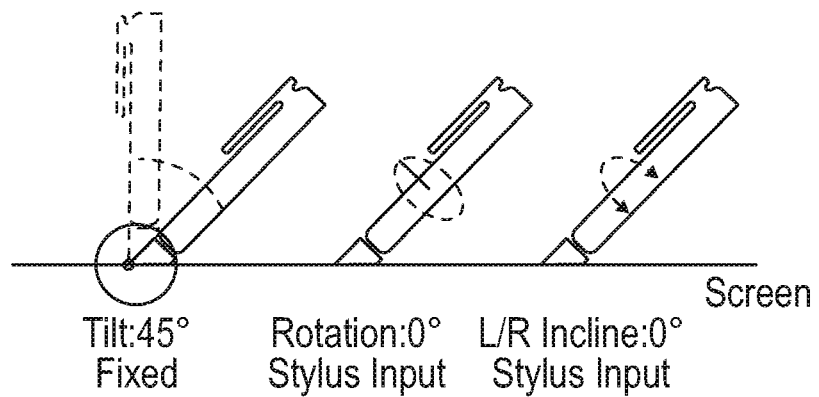

The assistant tool application 222 may have several properties, such as tip properties, ink properties and shape morphing properties. For example, for tip properties, stylus ink used to highlight, underline or enclose content may take the shape of a highlighter, so that the virtual tip of a stylus is slanted at a 45 degree angle, as shown in FIGS. 4A and 4B. Though the output on the display screen may remain the same for any position the user tilts the stylus, the assistant tool application 222 may send rotation and left/right incline input to influence the line that is drawn, thus catering better to the user's right or left handedness.

Figure 4C:
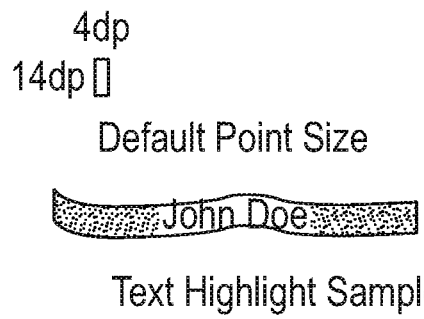

For ink properties of the assistant tool application 222, as shown in FIG. 4C, a tracing on the display may be made to look like a natural drawing with a highlighter by computing the rotation and incline of the stylus to deliver a natural stroke based on a default width and height (e.g., 4×14). For a highlighting stroke, the assistant tool application 222 may analyze any content that is directly underneath the ink of the highlighting (e.g., the ink of the highlighting overlays the content perpendicular to the display). Similarly, for an underlining stroke, the assistant tool application 222 may analyze any content that is directly above the ink of the underlining (e.g., the underlining and the content are on the same plane of the display). As another example, for a closed shape drawn around content, the assistant tool application 222 may analyze the content that is inside the closed shape.

Figure 5A:
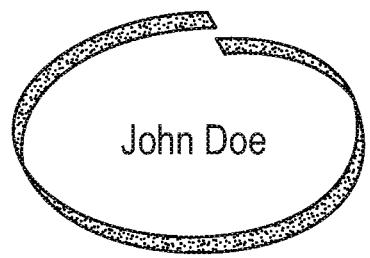
FIGS. 5A-5D are example illustrations associated with the disclosure of FIG. 2.
Figure 5B:
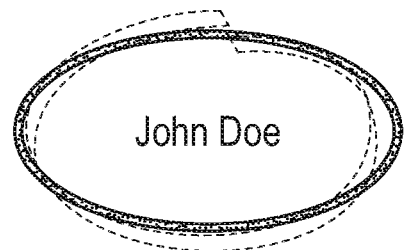
Figure 5C:
Figure 5D:

The shape morphing properties of the assistant tool application 222 may be used as validation and/or communication of success in selecting content. For example, as shown in FIGS. 5A and 5B, the assistant tool application 222 is successfully triggered by receiving valid input at an initial state when the user draws a substantially but not fully complete circle around a name. The assistant tool application 222 may also be successfully triggered by the user drawing a completely enclosed shape (e.g., circle, square, rectangle) around the name. The initial stroke may then be morphed into a uniform stroke having a unified width (e.g., 4 dp) and a uniform closed shape in an end state. Similarly, as shown in FIGS. 5C and 5D, a valid highlighting stroke triggers the assistant tool application 222 in an initial state, and the stroke is morphed (e.g., straightened) into a uniform stroke with a unified height (e.g., 14 dp) in an end state. The morphed uniform stroke may provide an indication of a selection of content (e.g., the content highlighted or enclosed by the morphed uniform stroke).

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
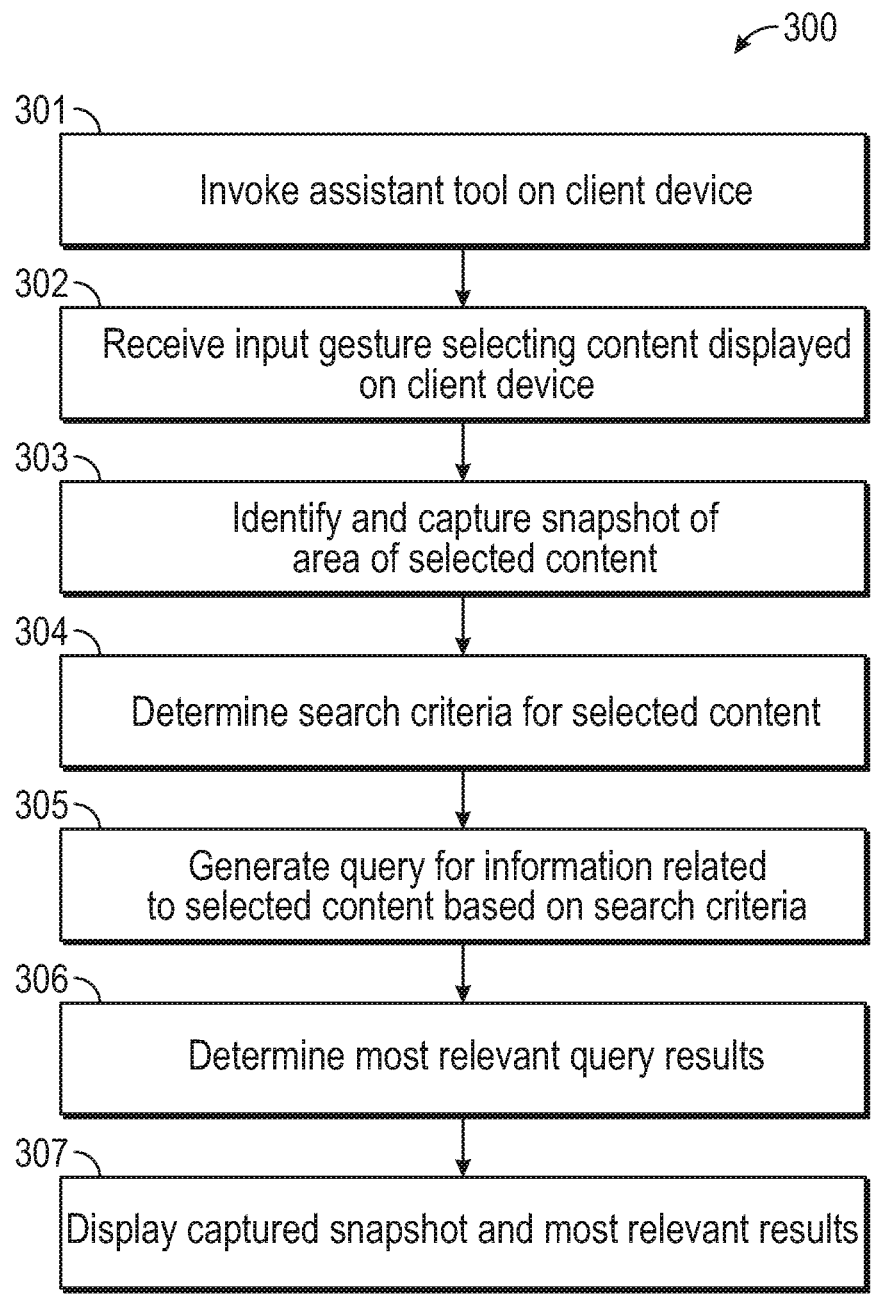
FIG. 6 illustrates an example process for providing interactive content and information that are related to selected content using the example client of FIG. 2.

FIG. 6 illustrates an example process 300 for selecting content and providing actions and/or information related to the selected content using the example client 110 of FIG. 2. While FIG. 6 is described with reference to FIG. 2, it should be noted that the process steps of FIG. 6 may be performed by other systems.

The process 300 begins in step 301 when an assistant tool is selected or invoked on a client device. The assistant tool is selected by a hardware trigger such as a stylus button or by a software trigger such as a menu selection. An input gesture from a stylus or a finger selecting content on the display of the client device is received by the assistant tool in step 302. Here, the input gesture (e.g., initial stroke on the display) may be morphed into a uniform stroke (e.g., final end stroke) on the display to validate and/or communicate successful selection of the content. Next, in step 303, the assistant tool identifies or determines an area of content within the input gesture selection and captures a snapshot of the identified area. In step 304, the selected content is analyzed to determine search criteria, and the assistant tool in step 305 generates a query for information related to the selected content based on the search criteria. The query may be performed on one or more servers and/or the client device. In step 306 the results of the query are analyzed and ranked to determine the most relevant query results. The ranking may also be performed on one or more servers and/or the client device. The assistant tool provides the captured snapshot and the most relevant query results for display on the client device in step 307.

An example will now be described using the example process 300 of FIG. 6, a client 110 that is a smartphone, an output device 214 that is a flat panel display, an input device 216 that is a stylus/touch screen interface, an assistant tool application 222 on the smartphone, a content item database 224 that stores content that can be displayed on the smartphone, and a communications module 218 that provides for communication between the smartphone client 110 and a network 150 of servers 130.

The process 300 begins in step 301 when a user invokes the assistant tool application 222 by pressing a button on the stylus 216 or selecting an assistant tool menu option on the display 214, which opens an assistant window on the display 214 that prompts the user to draw on the display 214 with the stylus 216 to select content. The user then circles the region around the text message "It's UA 1463" displayed on the flat panel display 214 of the client 110 using the stylus/touch screen interface 216, in step 302, where the user's input gesture is received by the assistant tool application 222. Next, in step 303, the assistant tool application 222 identifies a rectangular area of content within the circled region and captures a snapshot of the identified area (see FIG. 3C). The assistant tool application 222 analyzes the content in the circled region to determine that the portion of the text message "UA 1463" is a search criteria, in step 304. The assistant tool application 222, in step 305, generates a query for information related to "UA 1463." Here, the query may be performed on content item database 224 on the smartphone 110 and/or the content item databases 234 of servers 130 through communications modules 218, 238. In step 306, a ranking application on a server 130 and/or the assistant tool application 222 on the client 110 determine that the most relevant query results are the flight details of UA 1463, a link to search results and a link to flights from Austin. The process 300 ends with step 307, in which the assistant tool application 222 provides a response window with 1) the captured snapshot from step 303, a text box stating "Here's what I found" and 3) the most relevant query results of the flight details for UA 1463 (e.g., destination city, date, arrival time, arrival terminal and arrival gate), as well as additional options for further use of the information (e.g., a "Search results" button and a "Flights from Austin" button) to display on the flat panel display 214 (see FIG. 3C).

A computer-implemented method for providing information related to selected content may include, receiving, from an input source of a device, an indication of a selection of content on a display of the device, invoking an assistant tool on the device if the received indication meets or exceeds a trigger threshold, and providing, for display on the device, at least one of interactive content and information that are related to the selected content. The input source may be one of a stylus and a finger. A query for information related to the selected content may be generated, wherein the provided interactive content or information is based on results of the query.

The indication from the input source may be based on highlighting the content for selection with stylus ink and analyzing, by the assistant tool, the content underneath the stylus ink to generate the query. The indication from the input source may be based on at least substantially enclosing the content for selection with stylus ink and analyzing, by the assistant tool, the content enclosed by the stylus ink to generate the query. The indication from the input source may be based on underlining the content for selection with stylus ink and analyzing, by the assistant tool, the content underlined by the stylus ink to generate the query. The indication from the input source may be based on writing one or more words on the device display and analyzing, by the assistant tool, the written words to generate the query, wherein the additional content provided on the device display is suggested completions to the written words.

The assistant tool may morph an initial highlighting stroke of the input source with a unified height, and provide, on the device display, the morphed highlighting stroke having a uniform height and straightness. The assistant tool may morph an initial enclosing stroke of the input source with a unified width, and display, on the device, the morphed enclosing stroke having a uniform width and closed shape. The input source may be a stylus, wherein the virtual tip of the stylus maintains a defined slanted angle regardless of the tilt position of the stylus. The stylus may be configured to provide rotation and left/right incline input that influences the drawing of stylus ink on the display to align with a user's left or right handedness.

A system for providing information related to selected content may include a memory and a processor configured to execute instructions. The executed instructions may cause the processor to receive, from an input source of a device, an indication of a selection of content on a display of the device, and invoke an assistant tool on the device if the received indication meets or exceeds a trigger threshold. The executed instructions may also cause the processor to generate a query for information related to the selected content and provide, for display on the device, additional information related to the selected content. The indication from the stylus may be based on one of highlighting the content for selection with stylus ink, at least substantially enclosing the content for selection with stylus ink, underlining the content for selection with stylus ink, and writing one or more words on the device display. The assistant tool may morph an initial highlighting stroke of the input source with a unified height and provide, on the device display, the morphed highlighting stroke having a uniform height and straightness. The assistant tool may morph an initial enclosing stroke of the input source with a unified width and display, on the device, the morphed enclosing stroke having a uniform width and closed shape.

A non-transitory machine-readable storage medium having machine-readable instructions causes a processor to execute a method for providing information related to selected content. The method may include receiving, from a stylus, an indication of a selection of content on a display of a device, determining the received indication meets or exceeds a trigger threshold, invoking an assistant tool on the device, obtaining additional information related to the selected content, and providing, for display on the device, one or more of the obtained additional information. The method may also include selecting the content with a stylus, displaying the selection with uniformly proportioned stylus ink, and analyzing, by the assistant tool, the content indicated by the displayed stylus ink.

Hardware Overview

Figure 7:
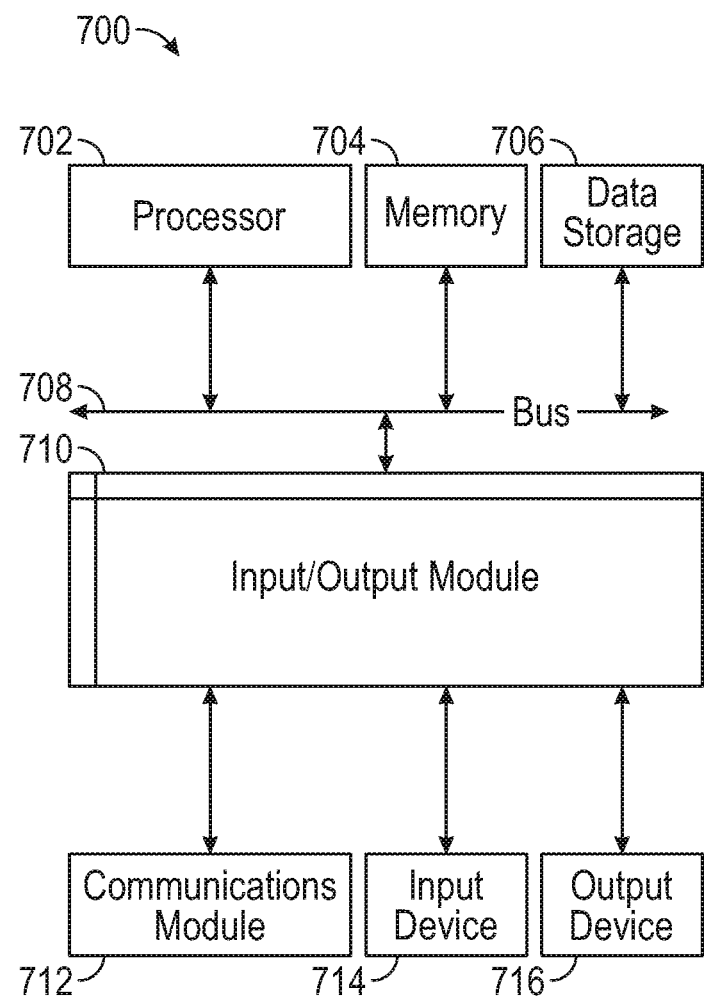
FIG. 7 is a block diagram illustrating an example computer system with which the clients and server of FIG. 2 can be implemented.

FIG. 7 is a block diagram illustrating an example computer system 700 with which the client 110 and server 130 of FIG. 2 can be implemented. In certain aspects, the computer system 700 may be implemented using hardware or a combination of software and hardware, either in a dedicated server, or integrated into another entity, or distributed across multiple entities.

Computer system 700 (e.g., client 110 and server 130) includes a bus 708 or other communication mechanism for communicating information, and a processor 702 (e.g., processor 212 and 236) coupled with bus 708 for processing information. According to one aspect, the computer system 700 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 700 may be implemented with one or more processors 702. Processor 702 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry. Expansion memory may also be provided and connected to computer system 700 through input/output module 710, which may include, for example, a SIMM (Single In Line Memory Module) card interface. Such expansion memory may provide extra storage space for computer system 700, or may also store applications or other information for computer system 700. Specifically, expansion memory may include instructions to carry out or supplement the processes described above, and may include secure information also. Thus, for example, expansion memory may be provided as a security module for computer system 700, and may be programmed with instructions that permit secure use of computer system 700. In addition, secure applications may be provided via the SIMM cards, along with additional information, such as placing identifying information on the SIMM card in a non-hackable manner.

The instructions may be stored in the memory 704 and implemented in one or more computer program products, i.e., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Example input/output modules 710 include data ports such as USB ports. In addition, input/output module 510 may be provided in communication with processor 702, so as to enable near area communication of computer system 700 with other devices. The input/output module 710 may provide, for example, for wired communication in some implementations, or for wireless communication in other implementations, and multiple interfaces may also be used. The input/output module 710 is configured to connect to a communications module 712. Example communications modules 712 (e.g., communications modules 218 and 238) include networking interface cards, such as Ethernet cards and modems.

The components of the system can be interconnected by any form or medium of digital data communication, e.g., a communication network. The communication network (e.g., network 150) can include, for example, any one or more of a PAN, a LAN, a CAN, a MAN, a WAN, a BBN, the Internet, and the like. Further, the communication network can include, but is not limited to, for example, any one or more of the following network topologies, including a bus network, a star network, a ring network, a mesh network, a star-bus network, tree or hierarchical network, or the like.

For example, in certain aspects, communications module 712 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 712 sends and receives electrical, electromagnetic or optical signals that carry digital data streams representing various types of information. The network link typically provides data communication through one or more networks to other data devices. For example, the network link of the communications module 712 may provide a connection through local network to a host computer or to data equipment operated by an Internet Service Provider (ISP). The ISP in turn provides data communication services through the world wide packet data communication network now commonly referred to as the Internet. The local network and Internet both use electrical, electromagnetic or optical signals that carry digital data streams. The signals through the various networks and the signals on the network link and through communications module 712, which carry the digital data to and from computer system 700, are example forms of transmission media.

Computer system 700 can send messages and receive data, including program code, through the network(s), the network link and communications module 712. In the Internet example, a server might transmit a requested code for an application program through Internet, the ISP, the local network and communications module 712. The received code may be executed by processor 702 as it is received, and/or stored in data storage 706 for later execution.

In certain aspects, the input/output module 710 is configured to connect to a plurality of devices, such as an input device 714 (e.g., input device 216) and/or an output device 716 (e.g., output device 214). Example input devices 714 include a stylus, a finger, a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 716 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 716 may comprise appropriate circuitry for driving the output device 716 to present graphical and other information to a user.

According to one aspect of the present disclosure, the client 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 702 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media.

Transmission media participates in transferring information between storage media. For example, transmission media includes coaxial cables, copper wire and fiber optics, including the wires that comprise bus 708. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for providing information related to selected content, the method comprising:
displaying content on a display of an electronic device;
invoking an assistant tool on the electronic device;
in response to invoking the assistant tool, providing, on the display of the electronic device, an assistant window as a window overlaying a portion of the content
prompting, by the assistant window, a selection of the content;
receiving, from an input source of the electronic device, an initial stroke on the display of the electronic device, wherein the input source is a stylus and the stylus is configured to provide rotation and left/right incline that influences drawing of stylus ink on the display to align with a user's left or right handedness;
morphing, by the assistant tool, the initial stroke of the input source on the electronic device into a uniform stroke, wherein the uniform stroke is an indication of a selection of the content and the morphing includes morphing a highlighting stroke as the initial stroke to have a uniform height and straightness and morphing an enclosing stroke as the initial stroke to have a uniform width and closed shape;
generating, by the assistant tool, a query for information associated with a portion of the selected content including metadata associated with the selected content;
receiving, by the electronic device, at least one highest ranked result based on the query and the metadata, wherein a result rank indicates relevance of the result to the portion of the selected content; and
providing, by the assistant tool, the received at least one highest ranked result for display in the assistant window and one or more interactive features related to the at least one highest ranked result.

2. The method of claim 1, further comprising:
identifying, by the assistant tool, an area of the selected content;
capturing, by the assistant tool, a snapshot of the identified area; and
providing, by the assistant tool, the captured snapshot for display in the assistant window.

3. The method of claim 1, wherein the indication from the input source is based on highlighting content for selection with stylus ink.

4. The method of claim 3, further comprising:
analyzing, by the assistant tool, the content underneath the stylus ink to generate the query.

5. The method of claim 1, wherein the indication from the input source is based on at least substantially enclosing the content for selection with stylus ink.

6. The method of claim 5, further comprising:
analyzing, by the assistant tool, the content at least substantially enclosed by the stylus ink to generate the query.

7. The method of claim 1, wherein the indication from the input source is based on underlining the content for selection with stylus ink.

8. The method of claim 7, further comprising:
analyzing, by the assistant tool, the content underlined by the stylus ink to generate the query.

9. The method of claim 1, wherein the indication from the input source is based on one or more words being written on the display.

10. The method of claim 9, further comprising:
analyzing, by the assistant tool, the one or more written words to generate the query, wherein the received at least one highest ranked result for display in the assistant window are suggested completions to an incomplete word or a sentence on the display.

11. The method of claim 1, wherein a virtual tip of the stylus maintains a defined slanted angle regardless of a tilt position of the stylus.

12. A system for providing information related to selected content, the system comprising:
- a memory; and
- a processor configured to execute instructions which, when executed, cause the processor to:
  - display content on a display of a client device;
  - invoke an assistant tool on the client device;
  - in response to invoking the assistant tool, provide an assistant window as a window overlaying a portion of the content on the display of the client device;
  - prompt, by the assistant window, a selection of the content
  - receive, from an input source of the client device, an indication of a selection of the content on the display, wherein the input source is a stylus and the stylus is configured to provide rotation and left/right incline that influences drawing of stylus ink on the display to align with a user's left or right handedness;
  - morph, by the assistant tool, an initial highlighting stroke of the input source with a unified height and provide, on the display, the morphed highlighting stroke having a uniform height and straightness;
  - morph, by the assistant tool, an initial enclosing stroke of the input source with a unified width and provide, on the display, the morphed enclosing stroke having a uniform width and closed shape;
  - generate, by the assistant tool, a query for information associated with a portion of the selected content including metadata associated with the selected content;
  - obtain, by the client device, at least one result based on the query and the metadata;
  - identify, by the assistant tool, an area of the selected content;
  - capture, by the assistant tool, a snapshot of the identified area; and
  - provide, by the assistant tool, the captured snapshot and the obtained at least one result from the query for display in the assistant window and one or more interactive features related to the at least one result.

13. The system of claim 12, wherein the indication from the stylus is based on one of:
- highlighting the content for selection with stylus ink;
- at least substantially enclosing the content for selection with stylus ink;
- underlining the content for selection with stylus ink; and
- writing one or more words on the display with stylus ink.

14. A non-transitory machine-readable storage medium comprising machine-readable instructions for causing a processor to execute a method for providing information related to selected content, the method comprising:
- displaying content on a display of a mobile device;
- invoking an assistant tool on the mobile device;
- in response to invoking the assistant tool, providing an assistant window as a window overlaying a portion of the content on the display of the mobile device;
- prompting, by the assistant window, a selection of the content
- receiving an initial stroke of an input source on the display, wherein the input source is a stylus and the stylus is configured to provide rotation and left/right incline that influences drawing of stylus ink on the display to align with a user's left or right handedness;
- morphing the initial stroke into a uniform stroke, wherein the uniform stroke is an indication of a selection of the content, wherein the morphing includes morphing a highlighting stroke as the initial stroke to have a uniform height and straightness and morphing an enclosing stroke as the initial stroke to have a uniform width and closed shape;
- generating, by the assistant tool, a query for information associated with the selected content including metadata associated with the selected content;
- receiving, by the mobile device, ranked results based on the query and the metadata, wherein a result rank is a confidence level of relevance to the selected content; and
- providing, by the assistant tool, the received ranked results for display in the assistant window and one or more interactive features related to the ranked results.

15. The non-transitory machine-readable storage medium of claim 14, further comprising:
- selecting the content with the stylus;
- displaying the selection with uniformly proportioned stylus ink; and
- analyzing, by the assistant tool, the content indicated by the stylus ink.

* * * * *

UNITED STATES PATENT AND TRADEMARK OFFICE
CERTIFICATE OF CORRECTION

PATENT NO. : 10,613,748 B2
APPLICATION NO. : 15/724227
DATED : April 7, 2020
INVENTOR(S) : Alcorn et al.

Page 1 of 1

It is certified that error appears in the above-identified patent and that said Letters Patent is hereby corrected as shown below:

In the Claims

In Column 18, Claim 1, Line 5, delete "content" and insert -- content; --, therefor.

In Column 19, Claim 12, Line 16, delete "content" and insert -- content; --, therefor.

In Column 20, Claim 14, Line 17, delete "content" and insert -- content; --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*